Feb. 10, 1953  R. C. TAYLOR  2,628,342
INDUCTANCE COIL
Filed Sept. 25, 1945  3 Sheets-Sheet 1

INVENTOR.
R. C. TAYLOR
BY
*A. A. Thomas*
ATTORNEY

Feb. 10, 1953      R. C. TAYLOR      2,628,342
INDUCTANCE COIL
Filed Sept. 25, 1945      3 Sheets-Sheet 2
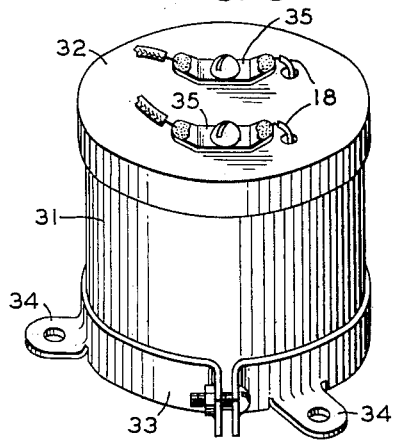
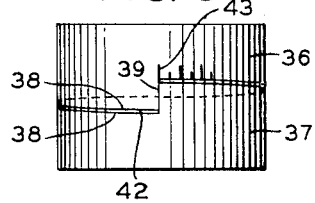
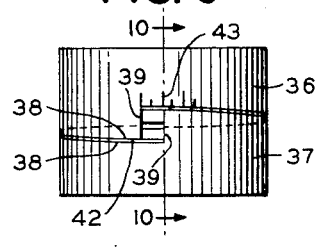
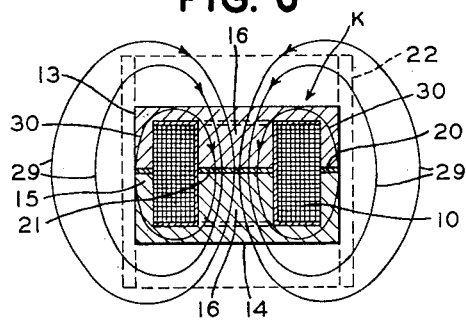
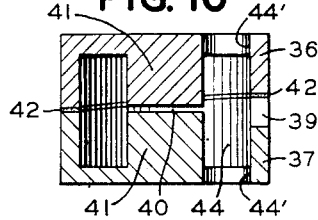
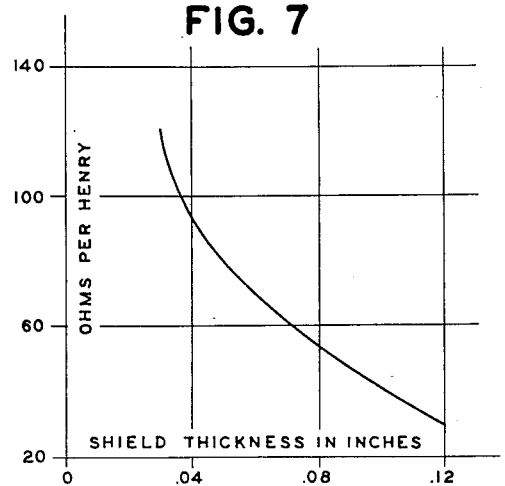
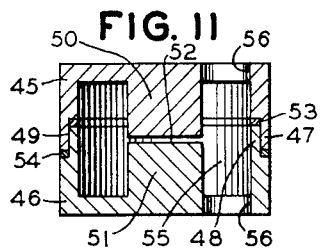
INVENTOR.
R. C. TAYLOR
BY
ATTORNEY Feb. 10, 1953 R. C. TAYLOR 2,628,342
INDUCTANCE COIL
Filed Sept. 25, 1945 3 Sheets-Sheet 3

*INVENTOR.*
R. C. TAYLOR
BY *A. A. Thomas*
ATTORNEY

Patented Feb. 10, 1953

2,628,342

UNITED STATES PATENT OFFICE 2,628,342

INDUCTANCE COIL

Roland C. Taylor, Ridgewood, N. J., assignor to The Western Union Telegraph Company, New York, N. Y., a corporation of New York Application September 25, 1945, Serial No. 618,429

7 Claims. (Cl. 336—45)

This invention relates to inductance devices such as inductance coils or transformers and its object is to provide a novel coil assembly particularly adapted for audio frequency operation in the electrical communication field where the requirements of coil design and performance are very exacting.

My new inductance coil has a shell type core of utmost simplicity comprising a minimum number of parts which are not only cheap to make but are easily assembled and adjusted to provide the proper inductance value of the coil. I further provide novel means for eliminating stray flux without undue power loss.

In a preferred embodiment of my invention, a spool wound coil is completely enclosed in a magnetic core composed of two molded sections which are cemented together by thermoplastic material to form a rigid unitary structure. The cementing material is carried by spacers of definite thickness which thus constitute an air gap of predetermined thickness in the magnetic core, so that the characteristics of the finished coil conform closely to the design data.

To shield the coil against outside interference and against stray lines of flux in its own field, I provide a heavy metal tube of high conductivity (preferably copper) which closely surrounds the core. This tube is of sufficient thickness to act as a short-circuited turn which presents a high reluctance to all flux lines attempting to link with it. The consequent result is twofold: first, the coil is shielded against outside magnetic interference and against interfering with other apparatus; second, the thickness of the copper shield results in a minimum coil loss within the audio frequency range. Virtually complete shielding of the coil is thus obtained, as I have demonstrated by actual tests.

The novel features and practical advantages of my new coil structure will be understood from a description of the accompanying drawings, in which.

Figure 2:
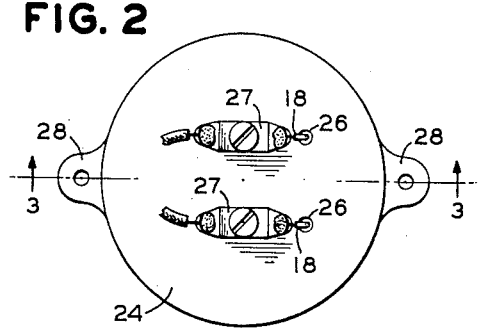
Fig. 2 is a plan of the assembled structure.
Figure 3:
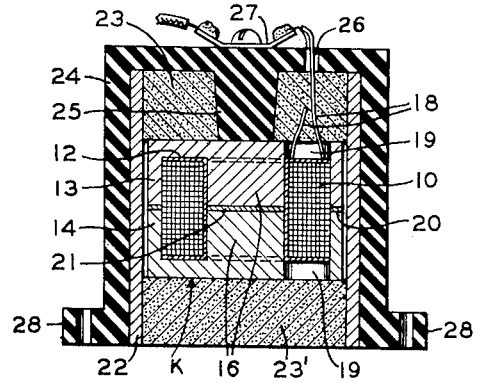
Figure 4:
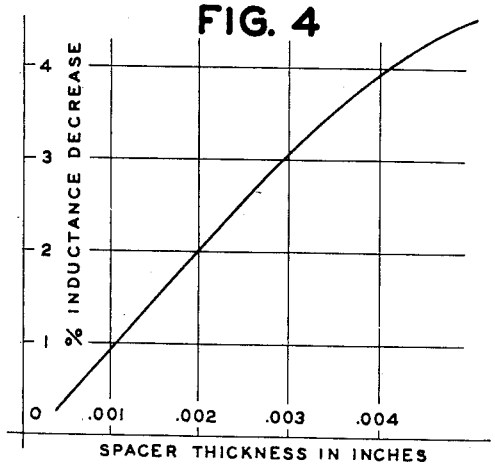
Figure 12:
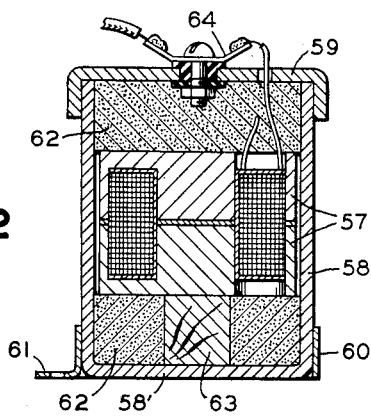
Figure 13:
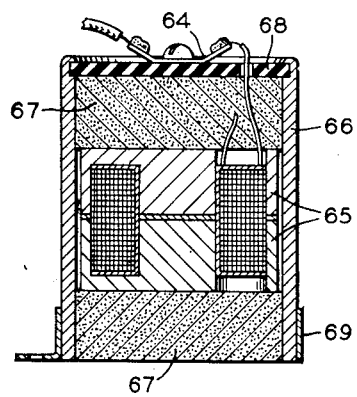
Figure 14:
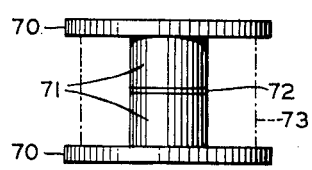

Fig. 3 presents a sectional view on line 3—3 of Fig. 2;

Fig. 4 shows a curve illustrating the relationship between varying spacer thickness and the corresponding inductance for a typical coil;

Fig. 5 shows a coil enclosed in an insulating case for mounting on a support;

Fig. 6 is a cross section of the magnetic core and winding to indicate diagrammatically the effect of shielding;

Fig. 7 shows a curve illustrating the relation between varying thicknesses of shielding tube and corresponding changes in ohms per henry of coil;

Figs. 8 and 9 illustrate a modified core structure which is adjustable to vary the central air gap;

Fig. 10 is a section on line 10—10 of Fig. 9;

Fig. 11 shows another modification of core structure with overlapping end portions;

Figs. 12 and 13 illustrate variations of the shielded core structure;

Fig. 14 shows a simplified magnetic core; and

Figure 15:
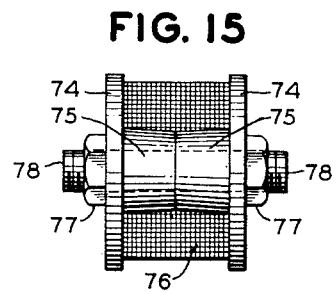

Fig. 15 shows a demountable mandrel for forming a winding without a spool.

Figure 1:
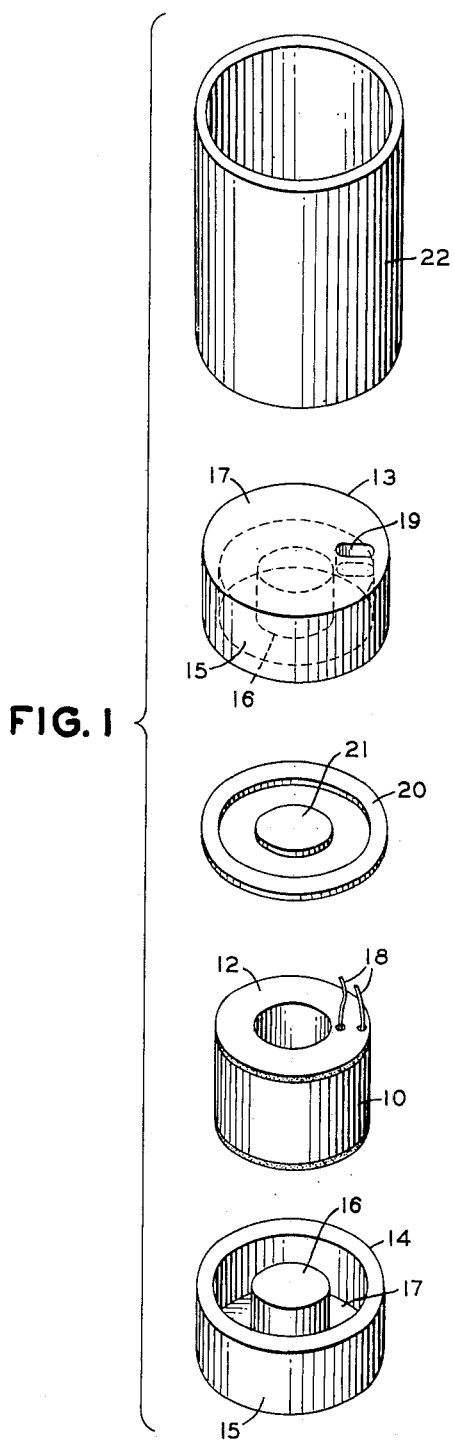
Fig. 1 is an exploded view of my shielded coil structure.

Referring to Figs. 1 and 3, there is a coil winding 10 which may be mounted upon a conventional spool 12 or otherwise held together, and this winding is inserted in a magnetic core consisting of two cup-shaped parts 13 and 14 fitted together. These core members are molded of magnetic material such as iron powder mixed with a suitable binder. In the embodiment of Figs. 1 and 3 the two core parts are identical and can be cast from the same mold. Each part comprises an outer cylindrical wall or leg 15, a central projection 16 and an end disk 17, thereby forming an annular space filled by the winding 10, which is thus completely enclosed within the magnetic core. The leads 18 of the coil pass through a radial slot 19 in the end disk 17 of the upper core member 13. If desired, the slots 19 may be sealed with wax or other suitable material after insertion of the leads.

I have provided novel means for binding the two core members together into a rigid unit in predetermined relationship. For this purpose I employ spacers 20 and 21 of paper or fibrous stock impregnated with a thermoplastic adhesive. The outer spacer 20 is a ring shaped to fit between the two outer legs 15 of the core, and the inner spacer 21 is a disk fitting between the ends of the cylindrical core projections 16. This is clearly shown in Fig. 3. With the spacers in place, the two core pieces are pressed together at an appropriate temperature and pressure to bind them securely together.

The spacers 20 and 21 will usually be made of paper but I contemplate using any fibrous, porous or mesh stock which is dimensionally stable and suitable for impregnating with a thermoplastic adhesive. Among such adhesives I may mention polyvinyl acetate, cellulose acetate, ethyl cellulose, shellac, cumar, and other gums and resins, natural or synthetic, which have the property of being adhesive when softened. At the present time I prefer to use polyvinyl acetate with which I have obtained excellent results. Shellac also has been used successfully. Impregnation of the spacers is accomplished by applying a properly concentrated solution of the adhesive in a volatile solvent (such as alcohol or acetone) to the spacer and drying thoroughly to remove all traces of the solvent. When I say that the spacers 20 and 21 are made of a material which is dimensionally stable, I mean that the physical dimensions of the spacers (especially the thickness) are not substantially altered by heat and pressure during the assembly of the core pieces.

The adhesive spacers 20 and 21 not only perform the function of firmly uniting the core members 13 and 14 but they also serve to produce air gaps of predetermined thickness in the magnetic core. One air gap is defined by the annular spacer 20 in the outer or circumferential leg 15 of the core, and the other air gap is defined by the disk spacer 21 between the central core projections 16. By selecting spacers of proper thickness the thickness of these air gaps in the finished coil will be accurately determined as required by the design data of the coil, although where necessary the spacer thickness can be changed to compensate for manufacturing variations. In other words, the spacer thickness for individual coils can be so adjusted in the course of assembly as to give the desired final inductance. It is clear then that the thickness of the air gaps thus produced is determined essentially by the thickness of the spacers 20 and 21 substantially independently of the adhesive with which the spacer material is impregnated. The spacers 20 and 21 as shown in the drawings are therefore to be considered as being each either a single spacer of certain thickness or built up of a plurality of thin spacers, and that applies to all the spacers in the various modifications to be described. For a typical coil constructed as above described, the relationship between spacer thickness and percentage change in inductance is indicated by the curve in Fig. 4 which is self-explanatory. For convenience I shall designate the assembled core parts 13—14 and winding 10 as the coil or coil unit K.

The coil K is enclosed in a shielding tube 22 of non-magnetic material having a high conductivity, preferably copper. Various practical means may be employed to hold the coil centrally in the tube which is preferably longer than the coil and extends beyond it at both ends. In Fig. 3 the coil structure is supported at the center of the tube by packing material 23—23' such as wax, and the tube itself may be enclosed in a casing 24 of insulating material. The top of casing 24 has a projection 25 which acts as a centralizing stop for the coil when it is slipped into the shielding tube 22. The coil leads 18 protrude through holes 26 in casing 24 and are attached to a pair of terminals 27 on the casing. The lower end of casing 24 may have perforated lugs 28 for mounting the entire assembly on any convenient support. The casing 24 and its projecting parts may be molded as one piece.

In assembling the particular form of coil structure illustrated in Fig. 3, the pot-shaped casing 24 is placed with its open end on top. The copper tube 22 is then inserted, preferably in a snug fit. The coil K is now placed on the post 25, leaving a narrow clearance space between the coil and the tube. Melted wax or similar material is poured into the tube, covering the coil. Some of the liquid wax will seep through the clearance space around the coil into the annular chamber surrounding the post 25. Enough wax is poured in to cover the coil with the layer or packing 23' which practically fills the casing and closes its open end. When the wax has hardened, the coil K is supported in casing 24 between the post 25 and the packing 23'. The position of coil K within the shielding tube 22 is preferably midway of the tube and this position of the coil is determined by the post 25.

Although Fig. 2 shows the wax mass 23 as filling the space around the post 25, that condition is not necessary and actually is not likely to happen in the assembly process I have described. Even if no wax seeped into the space around the post 25, the coil would still be tightly clamped between the post 25 and the packing 23'. Let it be understood that I use the convenient term "wax" to include any material resembling wax in pliability and adhesiveness and otherwise suitable for use in this connection.

The shield 22, which in its simplest form is an open copper tube, is sufficiently thick to act as a short-circuited turn of practically zero or negligible resistance for the eddy currents induced therein by the magnetic field of winding 10. Let us consider Fig. 6. If no shield were present, there would be a leakage of magnetic flux from core 13—14 into the surrounding air space as indicated by the lines 29. This leakage would be especially pronounced in a core of low permeability, such as is used here. However, when the core is surrounded by the shield 22, the counter magnetomotive force created by the induced eddy currents in the shield will be strong enough to oppose any stray lines and compel them to return through the outer leg 15 of the iron core, as indicated by the lines 30. In the same way does the shield 22 prevent outside magnetic interference from straying into the core 13—14.

There is another factor which helps to confine the magnetic flux of winding 10 in the iron path of the core. By making the cross sectional area of the outer annular leg 15 appreciably larger than the area of the central projection 16, the air gap reluctance is concentrated at the central projection. Consequently, the reluctance of the return path through the outer leg 15 of the core is smaller than that of the main central path through the projections 16, whereby the tendency of the flux is to stay in the low reluctance path of legs 15. By way of example I may mention that in a typical coil the cross section of the outer core leg 15 was 0.95 square inch and the cross section of the central projection 16 was 0.45 square inch.

I would call attention to the fact that the tube 22 produces effective shielding at a minimum coil loss. The current flowing in the short-circuited turn of the shielding tube is subject to an $I^2R$ loss, but this loss is minimized by the high conductance of the short-circuited turn. Further, as shown in Fig. 3, the copper shield 22 fits the magnetic core 13—14 very closely around the circumference, preferably as closely as commercial tolerances permit. This proximate arrangement of coil and shield contributes materially to the efficiency of the coil, especially with the use of a magnetic core of low permeability. Expressing this differently, I would say that the closely fitting shield 22 reduces the coil loss per uit of coil volume (ohms per henry per cubic inch to a minimum or a satisfactory low loss. This will be clear from Fig. 7 where the curve illustrates the reduction in ohms per henry of a typical coil as the thickness (and therefore the conductance) of the shielding tube 22 is increased. This effect is particularly pronounced in the audio range of frequencies which is roughly from 20 to 15,000 cycles per second, as officially recognized by the American Institute of Electrical Engineers. The efficiency of the shielding increases also with the length of the tube up to a certain point. I have found that for the most satisfactory shielding the tube should be at least one and one-half times as long as the core, preferably twice as long. Nothing is gained by making the tube longer than that.

It will be understood from the foregoing explanation that the shielding effect of tube 22 in the audio frequency range depends upon two factors: namely, the thickness of the tube and its conductivity. From a practical standpoint the best material for tube 22 is copper, which has high conductivity and is low in cost.

Regarding the thickness of tube 22, it should be such that its conductance as a short-circuited turn for the eddy currents induced therein shall be sufficiently high to shield the coil with minimum loss. I would point out here that the close proximity of tube 22 to the magnetic core has a direct bearing on its thickness. In inductance coils, as is well known, a shield arranged close to the magnetic core results in increased coil loss. Therefore, to reduce this coil loss it has been the practice to place the shield at an appreciable distance from the magnetic core. In such an arrangement, which necessarily increases the size of the coil, the thickness of the shield played no important part in the electrical properties of the coil and merely had to be such as to give the shield sufficient mechanical strength.

On the other hand, one of the practical objects to be obtained in my invention is a shielded coil structure with minimum dimensions and having a satisfactory low coil loss. To obtain this compactness it was necessary to place the shield 22 as close to the core as possible and to minimize the coil loss due to this juxtaposition of shield and core I used a shield with a greater thickness than needed for its mechanical strength. Only a tube of such thickness will act electrically, as above described, to reduce the coil loss as far as practical. Of course, the thickness of tube 22 need not go beyond the point where a further increase thereof would not appreciably reduce the coil loss. Referring to Fig. 7, it will be seen that the extension of the coil loss curve beyond the .12 inch ordinate would not produce a substantial further reduction. This is due to the fact that the eddy currents in tube 22 flow in or near the inner cylindrical face of the tube—that is, the surface adjacent to the peripheral wall of the magnetic core 13—14. Therefore, the tube 22 need only be thick enough to give a path of maximum conductance for eddy currents. For the best results, the thickness of copper tube 22 for audio frequency operation in the communication field is approximately between 40 and 90 mils.

In Fig. 5 the outer insulating case 31 has a separate top or cover 32 and a metal band 33 is clamped around the lower end of the case. The band 33 has integral lugs 34 for securing the coil unit to a suitable support. The coil leads 18 pass through holes in the cover 32 and are attached to terminals 35 which may be screwed into the cover. The construction inside the case 31 may be assumed to be the same as that inside the case 24 in Fig. 3, the only difference between these two designs being in the structure of the outer casing.

In the modification of Figs. 8 to 10 the two iron core pieces 36 and 37, molded of powdered iron, terminate each in a spiral or inclined edge 38. These two members are identical and can be cast from the same mold, as explained for the core parts 13 and 14. When the parts 36 and 37 are placed against each other in complementary relation, the two spiral edges 38 fit together. The two ends of each spiral edge are separated vertically by a shoulder 39. The purpose of the spiral edges 38 is to permit rotary adjustment of the core members with respect to each other so as to adjust the air gap 40 between the central legs 41. Before the parts 36 and 37 are assembled, a thin adhesive spacer 42 is placed on the spiral edge 38 of the lower member.

The two core pieces are so constructed that when first fitted together with a standard spacer, as shown in Fig. 8, with the shoulders 39 abutting, the air gap between the central legs 41 is zero. By twisting the core pieces on each other, the shoulders 39 separate laterally and the core members ride over the spiral track 38 thereby separating the central legs 41 axially and adjusting the air gap 40 to the desired thickness. A scale 43 may be cast or otherwise marked on the core members and calibrated in mils of air gap so that the workman knows when the inner air gap 40 is at the required thickness. Thereupon the core members are fixed in adjusted position by applying heat and pressure to the adhesive layer 42. What was previously said for the spacers 20 and 21 regarding their construction and function applies to spacer 42.

It should be noted that while the central legs 41 of core members 36 and 37 are moved axially with respect to each other by the rotary adjustment of the core members, the relationship between the two spiral edges 38 is not altered and they remain in contact with the spacer 42 which determines the fixed outer air gap of the assembled core structure. Instead of using an adhesive spacer 42 I may simply brush a thin layer of shellac or varnish over the spiral edges 38 and let it get tacky. Then after being adjusted as above described, the core members are pressed together and permanently united to form a rigid structure. The annular space 44 is intended to receive a winding like the one shown in Fig. 3, and the winding leads pass through a slot 44' in either core member. The core structure 36—37 is intended to be enclosed in a shielding tube such as the tube 22. It will therefore be understood that what has been said for the coil assembly of Fig. 3 applies fully to Figs. 8 to 10.

In the modified core structure shown in Fig. 11 the two cup-shaped members 45 and 46 have overlapping edges 47 and 48 which produce a circular contact area 49 in the outer circumferential leg of the core. This contact area between the two core members reduces the magnetic reluctance of the return path, whereby the small coil losses in the closely fitting shield 22 are still further reduced. As in the constructions previously described, the core pieces 45 and 46 have central legs or projections 50 and 51 which are separated by an air gap 52. The thickness of this air gap is determined by the thickness of the adhesive spacers 53 and 54.

What has been said for spacers 20 and 21 in Fig. 1 applies to spacers 53 and 54 in Fig. 11 without the need of repetition. Both spacers 53 and 54 are not absolutely necessary, for either may be used without the other, and both of these spacers may be omitted if a spacer is used in the central air gap 52, as shown in Fig. 3. The annular space 55 in core 45—46 is for a winding as shown in Fig. 3, where the core 13—14 may be replaced by the core 45—46, which also is molded of powdered iron. The slot 56 in each core member is for the winding leads to pass through. It will be seen that the core members 45 and 46 are not identical and therefore each requires its own mold.

In Fig. 12 the core structure 57, which may be considered identical with the core structure shown in Fig. 2, is completely enclosed in a copper shield 58. This shield comprises a cup-shaped piece with an integral base 58' and a separate copper cover 59 fitting tightly over the top edge of the cup. The cover 59 is preferably of the same thickness as the body of the shield and can be soldered in place or otherwise secured. A metal band 60 is clamped around the bottom of the shield and provided with perforated lugs 61 for attaching the coil unit to a convenient support.

The core structure 57 is held midway of the shield 58 by filling material 62 of wax or the like and a piece of wood 63 may be used to support the core structure before the wax hardens. The cover 59 carries insulated terminals 64 for receiving the leads of the winding. It will be seen that the core structure and its winding are completely surrounded by the shield 58 which thus gives substantially 100% shielding. A completely shielded coil like this may be necessary, for example, in connection with carrier systems in submarine cables where the received currents are exceedingly small and extraordinary precautions must be taken to prevent interference in these high frequency coils.

In the modification of Fig. 13 the core assembly 65 is supported midway in a coper tube 66 by wax fillings 67 or like material. The lower end of tube 66 is open and the top is closed by a cover 68 of insulating material which may be crimped in place or otherwise fastened to the tube. A band 69 similar to the band 60 of Fig. 12 may be used to mount the unit in the desired position. In this construction, as in Fig. 12, no outer casing is used for the shielding shell 66 to save space and expense.

Fig. 14 illustrates a simplified core structure in which the return leg is omitted. The two molded core parts are identical, each consisting of a flat disk 70 and a central cylindrical projection 71. The two parts are united by a thermoplastic spacer 72 which forms a central air gap. What has been said for spacer 21 in Figs. 1 and 3 applies to spacer 72. The dotted outline 73 represents a winding suported on the core structure which is intended to be enclosed in a shielding tube as described for Figs. 3, 5, 12 or 13. For certain applications, particularly where the winding carries a direct current component, this form of core structure may be especially useful.

In the various exemplifications of my coil structure which I have described, the winding is shown as being mounted on a spool. However, this spool is not necessary and may be replaced by a layer of paper or omitted altogether with consequent saving in space and cost. Fig. 15 illustrates a simple method of forming a spool-less winding. We have here a former or mandrel consisting of two separable parts 74 provided with abutting central cores 75 on which the required length of wire is wound to form the winding 76. Lock nuts 77 hold the parts 74 together and the device is supported in a lathe by means of a shaft 78, as will be understood without further description.

When the winding has been completed, it is impregnated with a suitable compound of a waxlike or resinous nature to hold the turns in place. The winding is then removed by separating the demountable members 74 and is inserted in the two-part core shown in any one of the structures previously described. After inserting the spool-less winding in the core, I prefer to pour a little melted wax into the wire turns to prevent possible movement thereof in the finished assembly and thereby eliminate possible abrasion of the insulation covering the wire.

It will be apparent from the foregoing description that I have provided an inductance coil characterized by extreme simplicity of structure and cheapness of manufacture combined with ease of assembly and adjustment to its correct electrical value. The efficiency and proper operation of the coil are insured by the heavy copper shield which functions with maximum effectiveness at a minimum loss to the coil. My novel process of uniting the two core parts with adhesive spacers of selected thickness makes it possible to maintain the air gaps at predetermined value without further tests or to permit ready adjustment of the air gap to give a desired inductance value. This ease of assembly permits apreciable cost reduction in the finished commercial article.

The core and winding in my coil assembly are free from mechanical stress and the winding is fully protected mechanically. The use of adhesive means to unite the core members does away with the disadvantages of mechanical fastening members (like screws and bolts) or the casting of holes for the this purpose, all of which may influence the magnetic characteristics of the finished coil. Another advantage peculiar to the powdered iron core in my invention resides in the fact that the inductance of the assembled coil is substantially independent of variations in winding space or shifting in the position of the winding on the core. In the broad aspect of my invention, the novel feature of binding the core sections together by adhesive means is applicable to any practical form of core structure.

For convenience I have shown the coil structure and shielding tube in the various embodiments as circular in cross section. This configuration, however, is merely by way of example and is not to be regarded in a limiting sense. Obviously, the core and shield may be square, rectangular, or of any other practical form, but in most applications of the coil the circular cross section is preferred. At some cost in efficiency certain of the various features of my invention need not be included in the same device. When I speak of a copper shield in the claims, I use the term "copper" as a convenient way to include any other high conductivity metal suitable for the purpose. The scope of my invention is defined in the appended claims, which permit changes and variations to be made in the construction of my new coil as a commercial article.

I claim as my invention:

1. As a new article of manufacture, a magnetic core part consisting of an integral cup-shaped member molded of powdered magnetic material, said member having a circular base with a central cylindrical projection and a circumferential wall which terminates in a spiral edge.

2. A magnetic core composed of two complementary parts, each part being a cup-shaped member with a cylindrical outer wall and a central projection, the ends of said walls being in overlapping engagement and providing peripheral grooves, a thermoplastic spacer in at least one of said grooves to secure the two parts together as a unitary structure, the annular chamber formed between the central projections and the surrounding outer walls being adapted to receive a coil winding.

3. A magnetic core comprising two cup-shaped members having each a cylindrical outer wall and a central projection, the engaging ends of said walls being oppositely inclined so that a relative turning movement of said members adjusts the air gap between said projections, and means for securing said members in adjusted position.

4. A magnetic core comprising two cup-shaped members having each a cylindrical outer wall and a central projection, the engaging ends of said walls being oppositely inclined so that a relative turning movement of said members adjusts the air gap between said projections, a scale on at least one of said members for indicating the thickness of the air gap during the rotary adjustment of the members, and means for securing said members in adjusted position.

5. An inductance coil comprising a magnetic core composed of two complementary parts, each part being a cup-shaped member with a cylindrical outer wall and a central projection, a winding mounted in the annular chamber formed by the two central projections and surrounding outer walls, the inner ends of said central projections being slightly separated to provide an air gap within the winding, the ends of said outer walls being in overlapping engagement and providing a pair of peripheral air gaps outside of the winding, and a non-magnetic spacer element in at least one of said air gaps for holding the two core parts in fixed spaced relation, the thickness of said air gap being determined by the thickness of said spacer element.

6. A shielded inductance device for audio frequency operation comprising an outer one-piece molded casing of insulating material open at one end and having a cover at the other end, an integral central post on the inside of said cover, a copper tube closely fitting in said casing, a coil unit including a magnetic core mounted in said tube which surrounds said core as closely as commercial tolerances permit, whereby said closely nested core, tube and casing form a compact assembly of minimum diameter, said tube being of such thickness and conductivity that the eddy currents induced therein are sufficiently strong to act as a low-loss shield for the coil unit, the coil loss due to the close proximity of the tube to the magnetic core being effectively decreased by the loss-reducing action of the tube due to its thickness, one end of said core abutting against the inner end of said post which holds the coil unit centrally within the tube, and an adhesive filler covering the other end of said core and closing the open end of said tube and casing, whereby said coil unit is firmly held in said tube and completely enclosed.

7. A shielded inductance coil for audio frequency operation comprising a cylindrical magnetic core enclosing a winding, a shield for said coil in the form of a copper tube fitting around said core as closely as commercial tolerances permit to provide a cylindrical coil structure of minimum diameter, the thickness of said tube being of the order of 40 to 90 mils to form a short-circuited conductor of negligible resistance for eddy currents induced by said winding, the coil loss due to the close proximity of the tube to the magnetic core being substantially reduced with increase of shield thickness within the specified limits, and means for binding said tube and core into a unitary structure.

ROLAND C. TAYLOR.

REFERENCES CITED

The following references are of record in the file of this patent:

UNITED STATES PATENTS

| Number | Name | Date |
|---|---|---|
| 654,390 | Fessenden | July 24, 1900 |
| 1,455,199 | Groton, Jr. | May 15, 1923 |
| 1,634,923 | Thullen | July 5, 1927 |
| 1,702,159 | Grunow | Feb. 12, 1929 |
| 1,713,941 | Adams et al. | May 21, 1929 |
| 1,722,362 | Wiley | July 30, 1929 |
| 1,748,993 | Purdy | Mar. 4, 1930 |
| 1,823,327 | Mac Donald et al. | Sept. 15, 1931 |
| 1,854,401 | Fitzsimmons | Apr. 19, 1932 |
| 1,878,606 | Schneider et al. | Sept. 20, 1932 |
| 1,956,334 | Parker | Apr. 24, 1934 |
| 1,998,378 | Mallory | Apr. 16, 1935 |
| 2,064,771 | Vogt | Dec. 15, 1936 |
| 2,078,422 | Smith | Apr. 27, 1937 |
| 2,113,603 | Polydoroff | Apr. 12, 1938 |
| 2,158,613 | Loughlin | May 16, 1939 |
| 2,180,413 | Harvey | Nov. 21, 1939 |
| 2,220,126 | Six et al. | Nov. 5, 1940 |
| 2,274,296 | Hughes et al. | Feb. 24, 1942 |
| 2,317,724 | Bergtold | Apr. 27, 1943 |
| 2,318,095 | Putnam | May 4, 1943 |
| 2,324,853 | Korte | July 20, 1943 |
| 2,327,784 | Hartzell | Aug. 24, 1943 |
| 2,350,029 | Glass, Jr. | May 30, 1944 |
| 2,367,591 | McAllister | Jan. 16, 1945 |
| 2,372,074 | Ford | Mar. 20, 1945 |
| 2,388,848 | Howe | Nov. 13, 1945 |
| 2,400,559 | Majlinger et al. | May 21, 1946 |

FOREIGN PATENTS

| Number | Country | Date |
|---|---|---|
| 440,791 | Great Britain | Jan. 6, 1936 |

OTHER REFERENCES

Radio Engineering, Terman, first edition, pp. 43, 44.

"Notes of Transformer," Electronics, Feb. 1944, pp. 106–109, 382, 388.

Radio Engineers' Handbook, Terman, first edition, pp. 34, and 128–131.